United States Patent [19]

Hershey

[11] 4,261,581

[45] Apr. 14, 1981

[54] MECHANICAL SEAL WITH IMPROVED FACE RING MOUNTING

[75] Inventor: Lowell E. Hershey, Portage, Mich.

[73] Assignee: Durametallic Corporation, Kalamazoo, Mich.

[21] Appl. No.: 140,388

[22] Filed: Apr. 14, 1980

[51] Int. Cl.³ .................................................. F16J 15/38
[52] U.S. Cl. ............................................. 277/9; 277/26; 277/81 R; 277/89; 277/96.1
[58] Field of Search ................... 277/9, 9.5, 26, 81, 277/88, 89, 91, 93 R

[56] References Cited

U.S. PATENT DOCUMENTS

| | | | |
|---|---|---|---|
| 3,116,066 | 12/1963 | Kopplus | 277/9 |
| 3,388,913 | 6/1968 | Tracy | 277/32 |
| 3,704,019 | 11/1972 | McHugh | 277/96.1 |
| 3,765,689 | 10/1973 | Adams | 277/26 |
| 3,776,560 | 12/1973 | Wentworth | 277/88 |

Primary Examiner—Robert I. Smith
Attorney, Agent, or Firm—Blanchard, Flynn, Thiel, Boutell & Tanis

[57] ABSTRACT

A mechanical seal construction having an annular face ring, preferably of hard material such as tungsten or silicon carbide, interference fitted within an annular flange formed on a seal ring. One of the face and seal rings is undercut so that the effective holding force between the flange and the face ring, as created by the interference fit, acts effectively only at, or at least adjacent, the central transverse plane of the face ring to substantially prevent distortion of the face ring. The inner end face of the face ring is axially spaced from the opposed end face on the seal ring, so that the face ring is supported on and engaged with the seal ring solely by the engagement therebetween substantially along the central transverse plane.

13 Claims, 4 Drawing Figures

MECHANICAL SEAL WITH IMPROVED FACE RING MOUNTING

FIELD OF THE INVENTION

This invention relates to a mechanical seal construction, and particularly a bellows-type seal construction, utilizing an improved interference-fit mounting between a seal ring and the annular face ring supported thereon.

BACKGROUND OF THE INVENTION

U.S. Pat. No. 3,765,689, assigned to Durametallic Corporation, discloses a mechanical seal construction employing an improved mounting arrangement for securing a face ring to a seal ring. As disclosed in this patent, the face ring is press fit into an annular recess formed at one end of the seal ring so that the face ring seats against an end surface of the seal ring. The seal ring has an annular axially-projecting flange which surrounds the external cylindrical periphery of the seal ring, which flange is suitably undercut to create an interference fit with the periphery of the face ring substantially at the central transverse plane thereof. This mounting arrangement minimizes twisting distortion of the face ring which, due to its construction from a hard and wear resistant material such as tungsten carbide, must be maintained in a substantialy nondistorted condition so that the flatness of the front seal face will be maintained.

The improved mounting arrangement of the aforesaid patent has proven highly successful in minimizing or at least reducing leakage past the relatively rotatable seal faces, particularly under conditions wherein the seal construction is used with low temperature fluids and the seal construction is of rather small diameter. However, under operating conditions wherein the seal construction is exposed to higher temperature fluids in the order of 350° to 400° F., or above, it has been observed that mounting the face ring in the manner disclosed by the aforesaid patent still results in twisting distortion of the face ring, and hence the flatness of the seal face is sufficiently destroyed as to permit undesired and sometimes unacceptable leakage between the relatively rotatable seal faces. Further, many industries are presently attempting to utilize mechanical seal contructions on larger pumps and the like used for handling high temperature fluids, and this in turn requires larger diameter seals. This has been observed to still further increase the amount of leakage between the seal faces, particularly when exposed to a high temperature fluid.

In addition to the problem of leakage across the seal faces, the industry trend toward utilizing larger seals under high temperature conditions has also resulted in many of these mechanical seal constructions being modified so as to incorporate a metal bellows in association therewith, inasmuch as such bellows is able to withstand both the high temperatures and the corrosive or chemical characteristics of the fluids without being degraded. Incorporation of a metal bellows into the mechanical seal construction, however, creates additional problems due to the fixation (as by welding) of the bellows to the seal ring, thereby making mounting of the face ring to the seal ring a more difficult endeavor.

Accordingly, it is an object of this invention to provide an improved mechanical seal construction employing an improved mounting between the face and seal rings, which mounting still creates an interference fit therebetween but substantially eliminates undesired distortion of the face ring, particularly when the seal construction is utilized with high temperature fluids and/or is of large diameter, so as to greatly minimize any leakage past the relatively rotatable seal faces.

A further object is to provide an improved seal construction, as aforesaid, wherein the interference fit between the seal and face rings results in the seal ring applying a radial holding force to the face ring substantially within the central transverse plane thereof to prevent imposition of distortion-causing moments on the face ring, which holding force defines the sole support and engagement between the face and seal rings.

Still a further object of this invention is to provide an improved seal construction, as aforesaid, wherein the seal ring has an annular flange surrounding at least a portion of the face ring, with the inner end of either the flange or face ring being undercut so that the flange engages the face ring substantially at, but only at, the central transverse plane thereof to thus impose a holding force on the face ring substantially only at, or at least adjacent, said plane, irrespective of the deflection of the flange as caused by the interference-fit engagement of the face ring within the flange. The inner axial end of the face ring is maintained spaced from, and hence not engaged with, the opposed end face on the seal ring to prevent the latter from imposing any distortion-causing moments on the face ring due to differential thermal expansion and/or residual contact or mounting stresses.

Another object of this invention is to provide an improved seal construction, as aforesaid, wherein the seal ring has a metal bellows fixedly joined to the end thereof opposite the face ring, and wherein the seal ring is also provided with internal and external tool-receiving grooves to facilitate the secure support of the seal ring to permit removal and replacement of a damaged face ring.

Other objects and purposes of the invention will be apparent upon reading the following specification and inspecting the accompanying drawings.

The objects and purposes of the invention are met by providing an improved mechanical seal construction for sealing a shaft which is relatively rotatable with respect to a wall. The seal construction has a first annular element which is nonrotatably secured relative to the wall, and a second annular element which is nonrotatably mounted relative to the shaft, these elements having opposed seal faces which are resiliently urged into sealing and rotatable sliding engagement with each other. One of the annular elements includes a seal ring having holding structure associated therewith for nonrotatably mounting a face ring by means of an interference fit. The holding structure includes an annular flange which projects axially from one end of the seal ring and defines an annular recess into which the face ring is interference fitted. The flange and face ring have an annular clearance therebetween adjacent the inner ends thereof, so that the flange exerts a radially inwardly-directed holding force around the periphery of the face ring, which holding force is disposed substantially within the central plane of the face ring. The inner end of the face ring is also axially spaced from the opposed end surface on the seal ring, whereby the face ring is supported on and engaged with the seal ring solely by the flange and the holding force imposed substantially along the central plane.

DETAILED DESCRIPTION

Figure 1:
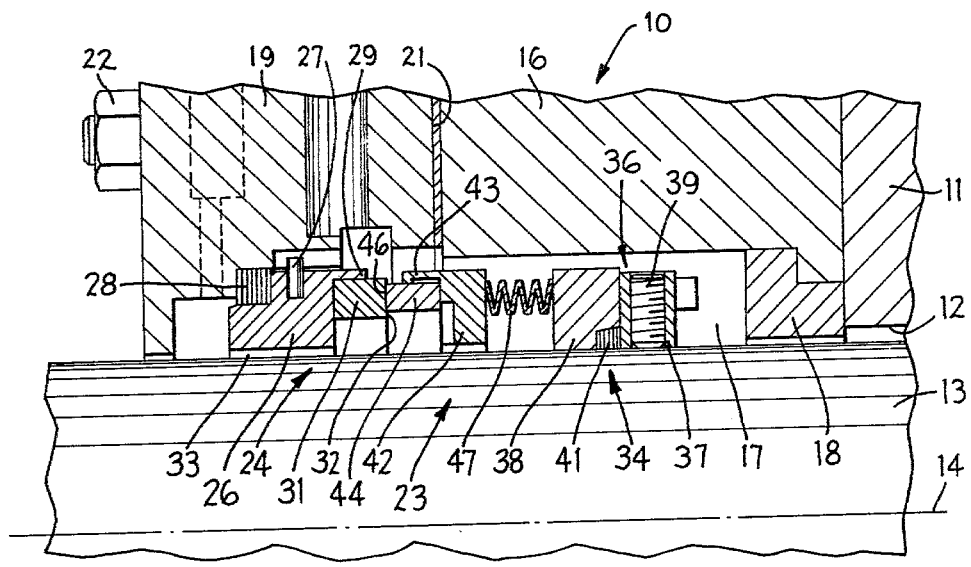
FIG. 1 is a fragmentary sectional view of a conventional bellow-type mechanical seal assembly.

FIG. 1 illustrates a shaft seal construction 10 associated with an apparatus which includes a wall 11 having an opening 12 through which extends a shaft 13 rotatable about its axis 14. The wall 11 may be part of any conventional fluid handling device, such as a pump, whereby pressurized fluid is thus present within the apparatus and hence tends to escape through the opening 12.

To prevent escape of fluid, the seal arrangement 10 is provided for creating a sealed relationship between wall 11 and shaft 13. For this purpose, the seal arrangement 10 includes a conventional annular stuffing box or housing 16 secured to the wall 11 in surrounding relationship to the shaft. The stuffing box 16 defines an annular chamber 17 which communicates with the opening 12. A conventional throat bushing 18 is normally associated with the inner end of this chamber 17 for restricting flow of pressure fluid through the opening 12 into the chamber.

A further annular housing element 19, commonly referred to as a gland, is positioned directly adjacent the stuffing box 16 and is suitably sealed thereto, as by an intermediate gasket 21. A plurality of conventional threaded fastening elements 22 are utilized for fixedly interconnecting the stuffing box 16 and gland 19 to the wall 11.

An "inside" type mechanical seal assembly 23 is disposed within the annular chamber 17 for creating a sealed relationship between the shaft 14 and the gland 19, while permitting relative rotation therebetween. The mechanical seal assembly 23 includes a stationary seal portion 24 which is nonrotatably connected to the gland 19. This portion 24 includes an annular seal member 26 (commonly referred to as a gland insert) which is nonrotatably connected to the gland 19 by a suitable key or pin 27. A sealing ring or gasket 28, such as an axially laminated gasket constructed of a graphite material sold under the name "Grafoil" (trademark), is provided between the gland 19 and the insert 26.

Insert 26 has an annular flange 29 which projects axially from the inner end thereof, which flange snugly and supportingly embraces (by means of an interference or press fit) an annular face ring 31, which latter ring defines a flat annular seal face 32 on the outer or exposed axial end thereof. A suitable annular clearance 33 exists between the insert 26 and the shaft 14 to permit unrestricted relative rotation and angular or lateral movement or deflection of the shaft relative to the surrounding housing.

The mechanical seal assembly 23 also includes a rotary seal portion 34. This latter portion 34 includes an annular collar 36 formed by first and second ringlike collar members 37 and 38, respectively, which are fixedly connected by suitable screws or the like. The collar is fixed to the shaft 13 by any conventional means, such as set screw 39. A suitable seal ring or gasket 41 is clampingly sealed between the two collar members to create a sealed engagement with the periphery of the shaft 13. This gasket 41 is also preferably of a layered or laminated graphite material.

Rotary seal portion 34 also includes a rotatable annular seal member 42 which surrounds the shaft 14 and has an inner diameter substantially larger than the shaft 14 to permit relative lateral and/or angular movement therebetween. The seal ring 42 has an annular flange 43 which projects axially from the outer end thereof, which flange defines an annular recess in which is positioned an annular face ring 44, the latter being fixedly mounted and supported on the seal ring by means of a press or interference fit within the flange 43. This face ring 44 defines a transverse or radial seal face 46 on the outer axial end thereof, which face 46 is urged into rotatable slidable engagement with the opposed seal face 32.

In the illustrated embodiment, a conventional metal bellows seal 47 extends between the collar 36 and the seal ring 42 for nonrotatably and sealingly joining same together. This bellows 47 encircles the shaft 13 and has on end thereof fixedly and sealingly connected, as by welding, to the collar 38. The other end of bellows 47 is fixedly and sealingly connected, as by welding, to the seal ring 42. The metal bellows 47 is of substantially conventional construction and includes a plurality of individual bellows plates, preferably constructed from stainless steel, with the adjacent bellows plates alternately having their inner and outer peripheries welded together around the complete peripheries thereof to provide a fluid-tight joint while at the same time permitting the bellows to have the desired flexibility.

The bellows 47 also functions as a resilient device for normally resiliently urging the seal ring 42 toward the gland insert 26, thereby maintaining the seal faces 32 and 46 in sealing engagement with one another. While the resiliency of bellows 47 is normally sufficient for this purpose, nevertheless additional resiliency can be provided if necessary by utilization of one or more conventional coil springs positioned for coaction between the collar 38 and the seal ring 42.

The face rings 31 and 44 are normally constructed of materials such as tungsten carbide or silicon carbide. These materials not only have different thermal expansion characteristics than the supporting rings (which often are stainless steel), but they are also extremely hard so that complex machining of the face rings is difficult, and they are not normally weldable.

The overall shaft seal arrangement 10 illustrated in FIG. 1, as briefly described above, is substantially conventional. Reference is made to U.S. Pat. No. 3,773,337, wherein this type arrangement is described in greater detail.

Figure 2:
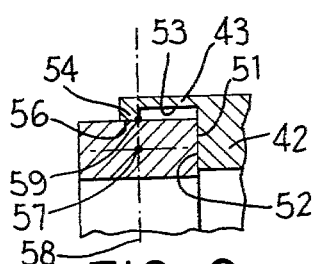
FIG. 2 is an enlarged fragmentary sectional view showing a construction of a conventional face and seal ring arrangement.
Figure 3:
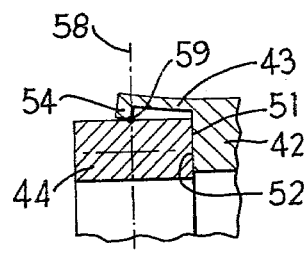
FIG. 3 is a view similar to FIG. 2 but illustrating, on an exaggerated scale, the deflection of the holding flange.

To minimize distortion of the face ring, specifically the face ring 44 due to the differential thermal expansion which exists between the face ring 44 and the seal ring 42, it has been discovered that mounting the face ring 44 in a manner similar to that illustrated by FIG. 2 tends to minimize distortion of the face ring, and hence minimize leakage between the seal faces 32 and 46. According to this mounting technique, the face ring 44 is pressed into the annular recess defined by the surrounding annular flange 43 such that the rear face 51 of the face ring 46 abuts the outer end surface 52 of the seal ring 42. In addition, a suitable annular clearance is formed between the flange 43 and the external periphery of the face ring 44 over approximately the rear one-half of the axial length of the face ring, which clearance is preferably provided by means of an undercut annular groove or recess 53 formed in the flange 43. This undercut groove 53 results in the formation of a narrow annular rib 54 which is formed directly at the free end of the flange 43 and projects radially inwardly thereof, so that the inner annular peripheral surface 56 of this rib 54 thus creates an interference fit with the exterior annular periphery of the face ring 44. The inner diameter of this peripheral surface 56, when the flange 53 is in an unstressed condition, is normally slightly smaller than the exterior diameter of the face ring 44. Thus, when the latter is pressed into the recess defined by flange 43, an interference fit is created between the face ring 44 and the annular rib 54, and this interference fit creates an outward angular deflection of the annular flange 43 which is illustrated on an exaggerated scale in FIG. 3. Thus, the interference fit between the face ring 44 and the rib 54 occurs primarily about the rear innermost edge or corner 59. While the contact at corner 59 in theory comprises a line which encircles the face ring 44, in reality the contact at corner 59 comprises a narrow band which encircles the face ring. This inner corner or edge 59 defines a transverse or radial plane 58 which is positioned so as to also define the central plane of the face ring 44, such that this plane 58 thus effectively passes through the centroid 57 of the face ring 44. This arrangement, as illustrated by FIGS. 2 and 3, thus attempts to support the face ring 44 by imposing a holding force thereon which is directed substantially radially inwardly relative to the face ring and effectively acts only at least adjacent the central transverse plane 58 of the face ring, thereby minimizing imposition of twisting moments on the face ring to accordingly minimize resulting distortion thereof. This supporting arrangement of FIGS. 2 and 3 is disclosed in greater detail in U.S. Pat. No. 3,765,689, as owned by the assignee of this application. The disclosure of this latter patent is, in its entirety, incorporated herein by reference.

While the mounting arrangement illustrated in FIGS. 2 and 3 has proven highly successful, nevertheless even this mounting arrangement permits undesired quantities of fluid to leak between the seal faces, specifically in use situations involving high temperature fluids (such as 350°–400° F. and above), and in use situations involving refinery pumps and the like wherein the seal assembly employs a bellows such that the seal assembly is of larger diameter. Under such use conditions, it has been observed that the mounting arrangement shown in FIGS. 2 and 3 still results in distortion of the face ring 44, which in turn affects the flatness of the seal face 46 and hence permits leakage therepast. While the exact reason for the distortion of the face ring 44 is not known, nevertheless it is believed that this distortion is caused by two factors.

One factor believed responsible for distortion of the face ring 44 is the contact which exists between the faces 51 and 52. The face ring 44 is presently pressed into the seal ring 42 until its rear face 52 abuts the surface 52. However, when the seal assembly is exposed to substantially high fluid temperatures, the different materials of the seal ring 42 and face ring 44, and the resulting differential thermal expansion between these materials, is believed to result in a reaction occurring between the faces 51 and 52 which is sufficient to distort the face ring 44 and hence affect the flatness of the seal face 46.

The other factor which is believed to cause distortion of the face ring 44 is the residual contact and mounting stresses which exist between the seal ring 42 and the face ring 44 (such as between the abutting surfaces 51 and 52) due to the press fitting of the face ring 44 into the seal ring. This press fitting obviously occurs under normal atmospheric temperature conditions. However, when the seal assembly is utilized under actual use conditions, the high temperature of the fluid, and the resulting differential expansion between the rings 42 and 44, is sufficient to at least partially relieve the residual mounting and contact stresses which were created during the initial press fit operaton, thereby also changing the external arrangement of forces and stresses imposed on the face ring 44, and hence causing distortion thereof sufficient to affect the flatness of the seal face 46. Since the face ring 44 is constructed of extremely hard material such as tungsten carbide, this material does not wear in, so that any nonflatness of the seal face 46 due to distortion of the face ring 44 thus remains for long periods of time, and hence permits substantially continuous (although limited) leakage between the seal faces 32 and 46.

In addition, as mechanical seal assemblies of this general type are utilized more extensively in the refining industry on equipment used for handling high temperature fluids, it becomes necessary to make such seal assemblies of larger diameter, and such seal assemblies also are now adopting the use of metal bellows in association therewith for permitting performance under these operating conditions. By going to these larger diameters, however, the distortion of the face ring 44 becomes even more acute since the leakage past the seal faces increases, sometimes significantly, as the diameters of the face rings increase.

Figure 4:
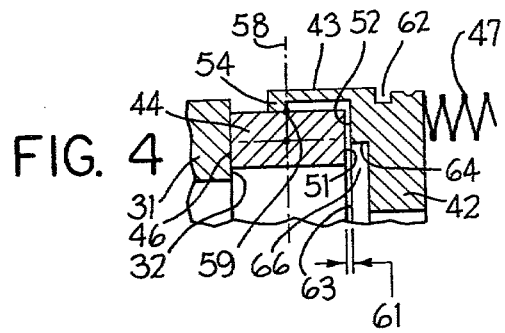
FIG. 4 is a fragmentary sectional view similar to FIG. 2 but illustrating the improvement according to the present invention.

Accordingly, to overcome the above disadvantages, the face ring in the improved seal assembly of this invention is mounted in the manner illustrated in FIG. 4. This mounting resembles that illustrated in FIG. 2 in that the face ring 44 is press fit into the annular recess defined by the flange 43, which flange is suitably undercut so that the rear inner edge or corner 59 is thus the effective point of contact between the seal ring 42 and the face ring 44, whereby a radially inwardly directed holding force disposed within the plane 58 is thus imposed on the face ring 44. This holding force is thus located substantially within the central plane of the face ring and effectively passes through the centroid thereof. In addition, the rear face 51 of the face ring 44 is disposed opposite but is maintained out of engagement with the surface 52 formed on the seal member 42, there being provided an axial clearance space 61 therebetween. This clearance 61 is preferably in the order of 0.002 inch to 0.007 inch. The presence of this clearance or gap 61 thus results in the face ring 44 being supported and engaged with the seal ring 42 solely by means of the narrow surrounding annular band defined by the contact between the inner edge 59 and the outer periphery of the face ring 44. Since the holding force imposed on face ring 44 as a result of the contact along the edge 59 is imposed radially inwardly substantially within the central plane 58, this force thus effectively passes through the centroid of the face ring and hence effectively prevents twisting distortion thereof. Since there are no other points of contact between the seal ring 42 and the face ring 44, any change in residual stresses or change caused by differential thermal expansion, when the seal ring is exposed to high temperature fluids, will accordingly not cause any significant twisting distortion of the face ring 44 so that the seal face 46 thereof will remain flat. Proper sliding contact is thus maintained between the flat seal faces 32 and 46, thereby normally maintaining any leakage therebetween to an insignificant amount.

Another problem commonly encountered with mechanical seal assemblies, particularly when the face rings 31 and 44 are constructed of extremely brittle materials such as tungsten carbide or silicon carbide, is that of chipping of the face ring. When this ring, such as the face ring 44, is chipped, the overall performance of the seal is seriously affected and repair is hence required. In the past, with mechanical seals which do not employ metal bellows, it has been conventional practice to discard not only the face ring 44 but also the seal ring 42 since it was generally considered less expensive to replace the whole unit. In the case of a bellows-type seal, however, the bellows is welded at opposite ends thereof to the seal ring 42 and the collar 38. Thus, if replacement of the face ring 44 becomes necessary, then this would require discarding of the complete rotary unit (namely face ring 44, seal ring 42, bellows 47 and collar 38). This would obviously be undesirably expensive. However, inasmuch as one end of the bellows 47 is welded to the seal ring 42, this makes it extremely difficult to remove the face ring 44 from the seal member 42 due to the very tight interference fit which exists therebetween. Also, any such removal attempt can be damaging to the delicate metal bellows 47.

To overcome this latter disadvantage, the present invention includes means associated with the seal ring 42 so as to permit removal and hence replacement of the face ring 44 in a manner without damaging or jeopardizing the bellows 47. For this purpose, the seal ring 42 is provided with a tool-receiving groove or recess 63 which, as illustrated in FIG. 4, is formed as an annular bore which extends axially inwardly from the end surface 52. This bore 63 has an outer diameter 64 which is greater than the inner diameter of the face ring 44, but less than the outer diameter thereof, thereby resulting in a groove or clearance 66 which is disposed directly behind and axially aligned with the rear face 51 of the face ring 44. This clearance space 66 thus enables a suitable tool to be inserted therein so as to react between the seal member 42 and the rear face 51, thereby permitting forced removal of the face ring 44 from the surrounding annular flange 43. Since removal of the face ring 44 also requires that the seal ring 42 be securely held without damaging the bellows, the seal ring 42 also has a suitable exterior tool-engaging means such as a groove or recess 62. This recess 62 preferably is an annular groove which totally encircles the exterior of the seal ring 42 and opens radially outwardly through the exterior cylindrical periphery thereof. This groove 62 is preferably formed in the main body portion of the seal ring 42, that is, it is spaced axially between the flange 43 and the bellows 47. This thus permits a suitable tool to be engaged within the groove 62 so as to externally and securely grip the seal ring 42 in such a manner as to avoid damage to the bellows 47, and at the same time a further tool can be inserted into groove or clearance 66 so as to forcibly displace the face ring 44. In this manner, a damaged face ring 44 can be replaced without requiring replacement of the total rotary seal portion.

While the invention described above, and as illustrated in FIG. 4, relates to the mounting of the face ring 44 within the seal ring 42, it will be appreciated that the other face ring 31 could be mounted on the insert 26 utilizing a mounting arrangement identical to that illustrated in FIG. 4 if desired.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a mechanical seal construction for sealing a shaft which is relatively rotatable with respect to a wall, said seal construction having first and second annular elements surrounding said shaft and having opposed transverse seal faces, said first element being non-rotatably secured relative to said wall and said second element being nonrotatably mounted relative to said shaft, and means for urging the seal faces into sealing and rotatable sliding engagement with each other, one of said annular elements including a seal ring and a face ring nonrotatably connected to the seal ring, and holding means coacting between the seal ring and the face ring for creating an interference-fit therebetween for fixedly connecting said face ring to said seal ring, said holding means imposing a holding force on said face ring directed substantially radially inwardly relative to said face ring and effectively acting only at least adjacent the central transverse plane of the face ring so as to not impose any substantial twisting moment on the face ring to minimize distortion thereof, said holding means including an annular flange fixedly and integrally connected to said seal ring and projecting axially from one end face thereof, said annular flange defining a substantially annular recess therein, comprising the improvement wherein said face ring is disposed within said annular recess with one axial end of said face ring being axially spaced from and maintained out of engagement with the one end face on said seal ring, the other axial end of said face ring having said seal face formed thereon, said annular flange creating said interference-fit with the annular peripheral surface of said face ring, and said face ring and flange having an annular clearance space formed therebetween adjacent said one end of said face ring so that the annular peripheral surface of said face ring adjacent said one end thereof is spaced from and maintained out of contact with said annular flange, said annular flange contacting and imposing a holding force on the annular peripheral surface of said face ring only at a location spaced axially from said one end thereof.

2. A seal construction according to claim 1, wherein said face ring is engaged with said seal ring solely by means of the interference-fit created between said face ring and said flange.

3. A seal construction according to claim 1, wherein the clearance space is defined by an undercut annular groove formed in the inner periphery of said annular flange adjacent the axially inner end thereof.

4. A seal construction according to claim 3, wherein said flange is substantially L-shaped in cross section and has a radially inwardly directed annular rib disposed adjacent the free end thereof, said rib being disposed in snug engagement with the outer periphery of said face ring for creating said interference-fit.

5. A seal construction according to claim 1 or claim 2, wherein said face ring has a maximum normal outer diameter greater than the minimum normal internal diameter of said annular flange to create said interference-fit therebetween when the face ring is fixed into the recess defined by said flange, said flange contacting said face ring only within a narrow annular ringlike area disposed substantially to include the central transverse plane of said face ring due to said flange being angularly deflected when said face ring is positioned within said recess.

6. A seal construction according to claim 2, wherein said face ring and said seal ring are constructed from different materials having substantially different coefficients of thermal expansion.

7. A seal construction according to claim 1 or claim 2, wherein said seal ring has an annular, radially outwardly opening, tool-engaging groove formed around the external periphery thereof.

8. A seal construction according to claim 1, wherein the urging means includes a metal bellows disposed in surrounding relationship to said shaft and having one end thereof fixedly connected to said seal ring at the end thereof opposite from said annular flange, the other end of said metal bellows being fixed to a collar which is nonrotatably secured to said shaft, and said seal ring having an annular tool-engaging groove formed in its external periphery and opening radially outwardly thereof, said tool-engaging groove being formed in the seal ring at a location spaced axially from said one end face thereof so as to be located axially between said one end face and said bellows.

9. A seal construction according to claim 8, wherein the one end face of said seal ring has an undercut clearance groove formed therein and projecting radially of said seal ring to a point which is greater than the inner diameter of said face ring but smaller than the outer diameter of said face ring for permitting a tool to be inserted behind the inner end of said face ring to permit removal of same from said seal ring.

10. A seal construction according to claim 1 or claim 2 or claim 6, wherein the inner end of said face ring and said one end face of the seal ring have an axial clearance space therebetween in the range of 0.002 inch to 0.007 inch.

11. In a mechanical seal construction for sealing a shaft which is relatively rotatable with respect to a wall, said seal construction having first and second annular elements surrounding said shaft and having opposed transverse seal faces, said first element being nonrotatably secured relative to said wall and said second element being nonrotatably mounted relative to said shaft, said second annular element including a seal ring with an annular flange projecting axially from one end thereof and defining an annular recess, said second element also including an annular face ring nonrotatably connected to said seal ring by being positioned within said annular recess and being engaged with said annular flange by means of an interference-fit therebetween, said face ring having the outer end face thereof defining one of said transverse seal faces, means for urging the transverse seal faces into sealing and relatively rotatable sliding engagement with each other, said means including metal bellows means disposed in surrounding relationship to said shaft and having one end thereof fixed to said seal ring at the end thereof which is opposite said flange, and the other end of said metal bellows being fixedly secured to an annular collar which is nonrotatably connected to said shaft, comprising the improvement wherein said seal ring defines thereon an end surface which defines the bottom of said annular recess, said end surface being disposed opposite the inner end face of said face ring, said seal ring having a tool-receiving clearance groove formed therein which projects axially inwardly from said end surface and which also projects radially outwardly beyond the inner diameter of said face ring to permit a tool to be inserted behind the inner end face of said face ring, said seal ring also having tool-engaging means formed on the exterior annular periphery thereof at a location disposed between said flange and said bellows.

12. A seal construction according to claim 11, wherein said tool-engaging means comprises a narrow annular groove which completely externally encircles said seal ring, and said tool-receiving groove comprising an annular bore which extends axially inwardly from said end surface, said annular bore having an outer diameter which is greater than the inner diameter of said face ring but less than the diameter of said annular recess.

13. A seal construction according to claim 11 or claim 12, wherein the inner end face of said face ring is axially spaced from the end surface on said seal ring by means of a small clearance distance, the axial width of said small clearance distance being substantially less than the axial depth of the tool-receiving groove.

* * * * *

UNITED STATES PATENT AND TRADEMARK OFFICE
CERTIFICATE OF CORRECTION

PATENT NO. : 4 261 581
DATED : April 14, 1981
INVENTOR(S) : Lowell E. Hershey

It is certified that error appears in the above—identified patent and that said Letters Patent is hereby corrected as shown below:

Column 1, line 28; change "substantialy" to ---substantially---.

Column 4, line 28; change "on" to ---one---.

Column 5, line 64; change "face 52" to ---face 51---.

Signed and Sealed this

Eighteenth Day of August 1981

[SEAL]

Attest:

GERALD J. MOSSINGHOFF

*Attesting Officer*     *Commissioner of Patents and Trademarks*